(12) United States Patent
Watanabe

(10) Patent No.: US 8,358,350 B2
(45) Date of Patent: Jan. 22, 2013

(54) IMAGING DEVICE AND SUBJECT DETECTION METHOD

(75) Inventor: Yoshikazu Watanabe, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 420 days.

(21) Appl. No.: 12/439,071

(22) PCT Filed: Sep. 12, 2007

(86) PCT No.: PCT/JP2007/068219
§ 371 (c)(1),
(2), (4) Date: Feb. 26, 2009

(87) PCT Pub. No.: WO2008/032860
PCT Pub. Date: Mar. 20, 2008

(65) Prior Publication Data
US 2009/0262213 A1 Oct. 22, 2009

(30) Foreign Application Priority Data

Sep. 13, 2006 (JP) .............................. 2006-247574
Jul. 30, 2007 (JP) .............................. 2007-197730

(51) Int. Cl.
H04N 5/228 (2006.01)
H04N 5/225 (2006.01)
H04N 5/335 (2011.01)
H04N 5/232 (2006.01)
G06K 9/00 (2006.01)

(52) U.S. Cl. ........... 348/222.1; 348/208.14; 348/333.01; 348/169; 348/345; 382/103; 382/115; 382/118; 382/170; 382/171

(58) Field of Classification Search .......... 348/143–158, 348/169–172, 207.99, 207.1–207.11, 208.14, 348/222.1, 333.01–333.12, 345–357; 382/103, 382/115, 118, 170–171
See application file for complete search history.

(56) References Cited

U.S. PATENT DOCUMENTS

| 5,739,857 | A | 4/1998 | Kaneda |
| 5,898,457 | A | 4/1999 | Nagao et al. |
| 6,417,883 | B1 | 7/2002 | Kaneda |
| 7,027,171 | B1 | 4/2006 | Watanabe |
| 7,324,139 | B2 | 1/2008 | Watanabe |
| 2003/0103647 | A1 | 6/2003 | Rui et al. |
| 2004/0207743 | A1* | 10/2004 | Nozaki et al. ............ 348/333.12 |
| 2005/0052533 | A1* | 3/2005 | Ito et al. ........................ 348/169 |
| 2005/0179780 | A1* | 8/2005 | Kikkawa et al. .......... 348/207.99 |
| 2005/0219395 | A1* | 10/2005 | Sugimoto ................ 348/333.12 |
| 2005/0270399 | A1* | 12/2005 | Kawaguchi et al. ..... 348/333.11 |

(Continued)

FOREIGN PATENT DOCUMENTS

EP 0 441 380 A1 8/1991

(Continued)

Primary Examiner — Jason Chan
Assistant Examiner — Michael Osinski
(74) Attorney, Agent, or Firm — Dickstein Shapiro LLP

(57) ABSTRACT

An imaging device includes a first detection part which detects one or more subjects in an image captured by the image capturing part capturing an image continuously; a second detection part which follows the one or more subjects detected; and a system control part which includes a setting part setting a part of the image as a limited region, and causes, after the first detection part detects the one or more subjects in the captured image, the second detection part to follow and detect a subject in an image captured subsequently to the captured image, and causes the first detection part to detect a subject in the limited region.

2 Claims, 8 Drawing Sheets

U.S. PATENT DOCUMENTS

| | | |
|---|---|---|
| 2006/0059201 A1 | 3/2006 | Watanabe |
| 2006/0104487 A1* | 5/2006 | Porter et al. ............... 382/118 |
| 2008/0089560 A1* | 4/2008 | Li et al. ..................... 382/118 |

FOREIGN PATENT DOCUMENTS

| | | |
|---|---|---|
| JP | 03-234180 | 10/1991 |
| JP | 5-22649 | 1/1993 |
| JP | 11-150676 | 6/1999 |
| JP | 2003-92699 | 3/2003 |
| JP | 2003-107335 | 4/2003 |
| JP | 2005-348181 | 12/2005 |
| JP | 2006-60329 | 3/2006 |
| JP | 2006-211139 | 8/2006 |

* cited by examiner

US 8,358,350 B2

IMAGING DEVICE AND SUBJECT DETECTION METHOD

PRIORITY CLAIM

The present application is based on and claims priority from Japanese Patent Application Nos. 2006-247574, filed on Sep. 13, 2006, and 2007-197730 filed on Jul. 30, 2007, the disclosure of which is hereby incorporated by reference herein in its entirety.

TECHNICAL FIELD

The present invention relates to an imaging device which detects and follows a subject as well as to a subject detection method therefor.

BACKGROUND ART

There is a known imaging device for detecting a main subject, particularly the face of a person, through image recognition, to adjust a focal length and the like by use of a result of the detection. Also, for example of such an imaging device, Japanese Patent Laid-open Publication No. 2003-107335 discloses a first known conventional imaging device which performs a face detection and sets a region detected as a focus adjustment region. Further, Japanese Patent Laid-Open Publication No. 2006-60329 discloses a second known conventional imaging device which decides a main subject by detecting a skin color thereof and follows the main subject using pattern matching, for example. Such imaging devices are suitable for taking portrait pictures so that they are useful especially for novice users not familiar with manipulation to a camera.

Moreover, Japanese Patent Laid-Open Publication No. 2003-92699 discloses a third known conventional imaging device which detects not only a single main subject but also a plurality of subjects in a captured image to make a control to have all of the subjects in focus. Such an imaging device is good for shooting a plurality of people as a subject such as in commemorative photographs.

In addition, in terms of detection processing, the operation to follow the main subject determined using pattern matching as the one described in Japanese Patent Laid-Open Publication No. 2006-60329 is made by following the main subject by use of a previous detection result, thereby making it possible to perform the detection at a higher speed than to detect a subject anew in an entire image, and to quickly follow the subject according to movement of a person or a change of angle of view.

A difference in the processing speed will be described with reference to FIGS. 3A and 3B In FIG. 3A, the number 100 represents image data obtained by continuously capturing an image and to be displayed on a display part such as LCD in order to decide a framing of the image during a standby period for shooting. The number 101 represents image data used in the face detection processing, and the arrows between the image data 101 represent a period in which the detection processing is being performed. This face detection processing is performed by intermittently selecting data from the image data captured for the purpose of shortening a time-taking detection processing time.

In contrast, FIG. 3B shows a face following processing to be performed once the face is detected.

The number 102 represents image data used in the face following processing, and the arrows between the image data 101 represent a period in which the face following processing is being performed. As shown in FIG. 3B, in the face following processing, the face detection is made at a higher speed than when a face is detected anew, enabling a detection result to be obtained at a shorter interval.

DISCLOSURE OF THE INVENTION

The face following processing according to the second conventional imaging device, however, has a problem that it cannot deal with detecting and processing a plurality of faces as in the third conventional imaging device.

For example of shooting three people as shown in FIG. 6, when face detection is made impossible because one of the three people turns away, as shown in the drawing, in the middle of the following processing on the faces of the three people, and the person turning away turns back his face to the front later, the face detection for the three people cannot be resumed. Another problem is that it is difficult to detect a new subject appearing in the image during shooting in a short period of time.

The present application aims to solve the above-identified problems, and an object thereof to provide an imaging device and a subject detection method for making it possible to deal with changes in a state of a subject recognized.

In view of solving the above problems, an imaging device according to the present invention is configured to include an image capturing part which captures an image continuously; a first detection part which detects one or more subjects in an image captured by the image capturing part; a second detection part which follows and detects the one or more subjects detected; and a control part which includes a setting part setting a part of the image as a limited region, and causes, after the first detection part detects the one or more subjects in the captured image, the second detection part to follow and detect a subject in an image captured subsequently to the captured image, and causes the first detection part to detect a subject in the limited region.

In view of solving the above problems, a subject detection method according to the present invention includes a first detection step of detecting one or more subjects in an image captured; a second detection step of following and detecting the one or more subjects detected, the second detection step being able to be processed at a higher speed than the first detection step; and a step of following and detecting, by the second detection step, after detecting the one or more subjects by the first detection step in an image continuously captured, a subject in an image captured subsequently to the captured image, and detecting, by the first detection step, a subject in a limited region which is set in a part of the image.

BEST MODE FOR CARRYING OUT FOR THE INVENTION

Hereinafter, the embodiments of the present invention will be described with reference to the drawings.

(First Embodiment)

A digital still camera device 1 functioning as an imaging device according to the first embodiment will be described with reference to FIGS. 5 to 10.

Figure 1:
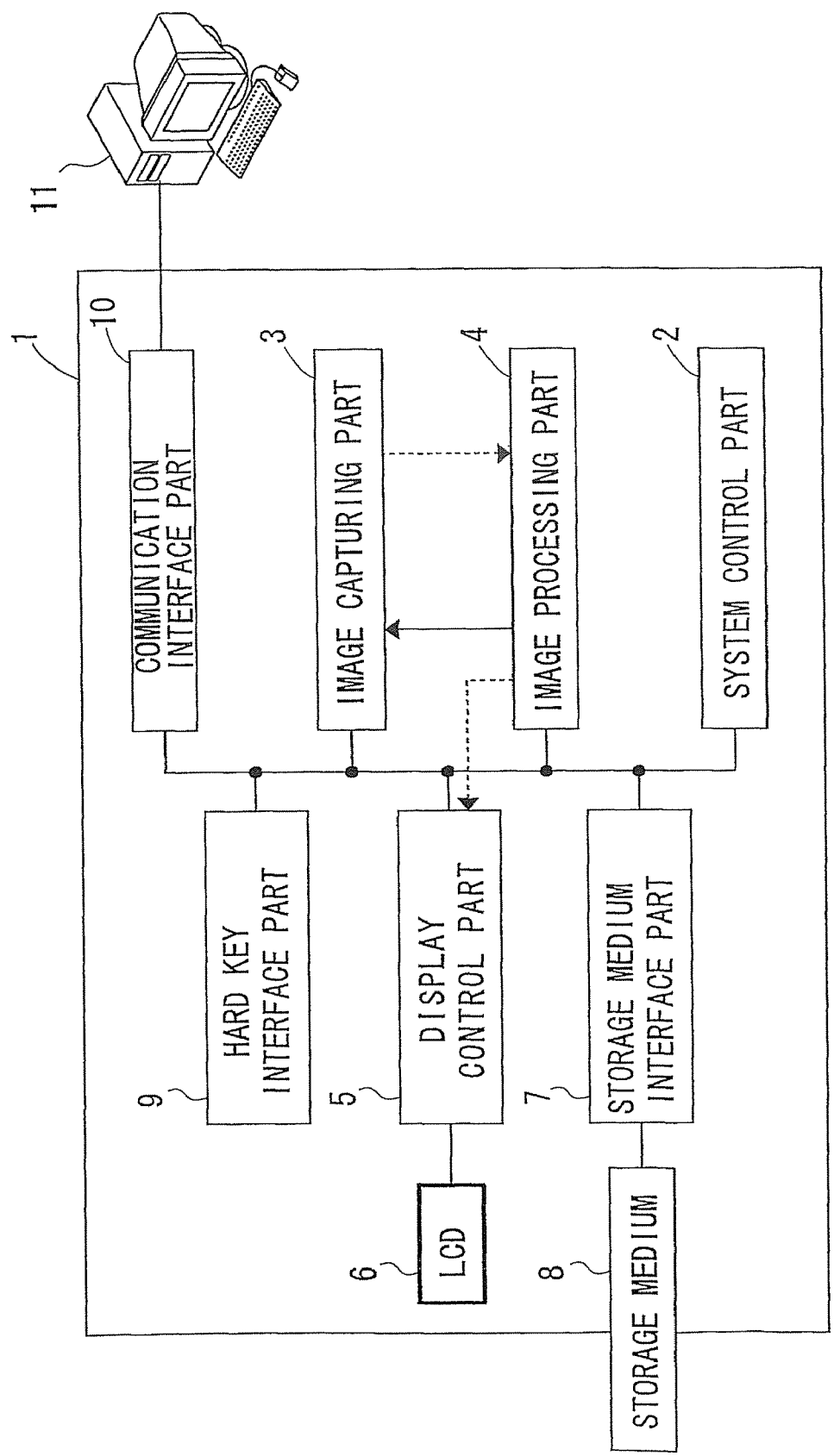
FIG. 1 shows the configuration of a digital still camera device 1 according to a first embodiment of the present invention.

FIG. 1 is a schematic diagram of the digital still camera device 1 and a connected apparatus 11.

As shown in FIG. 1, the digital still camera device 1 includes an image capturing part 3, an image processing part 4 having a first detection part and a second detection part, and a control part such as a system control part 2 inclusive of a setting part. The first detection part detects one or more subjects in an image captured by the image capturing part. The second detection part follows and detects the one or more subjects detected. The setting part sets a part of an image as a limited region. The digital still camera device 1 further includes a display control part 5, an LCD 6 (Liquid Crystal Display; liquid crystal monitor), a storage medium interface part 7, a storage medium 8, a hard key interface part 9, a communication interface part 10.

The system control part 2 is provided for making a total control of the digital still camera device 1 and includes a main CPU, NAND flash memories, SDRAMs, a timer, and the like, which are not shown.

The image capturing part 3 captures images and provided with optical components (lenses and a lens drive motor), CCDs, a CCD driver circuit, an A/D converter and so on, which are not shown.

The image processing part 4 is provided for performing various kinds of image processing on image signals obtained by the image capturing part 3, controlling the CCD driving timing and the lens drive motor of the image capturing part 3 to conduct zooming, focusing, exposure adjustment or the like, and performing image compression/expansion, and it includes a DSP (digital signal processor) for image processing, RAMS, and so on, which are not shown.

The display control part 5 is provided for performing signal processing on image signals processed by the image processing part 4 for display on the LCD 6 and generating various graphical images for user interface in order to display on the LCD 6, and it includes a D/A converter, an OSD controller and the like, which are not shown.

The LCD 6 is provided for image display and graphical display for user interface.

The storage medium interface part 7 is provided for interface with a storage medium 8, and includes a not-shown memory card controller and so on.

The storage medium 8 is provided for storing compressed image signals in flash memories or the like and various information related to images, and is attached detachably to the digital still camera device 1.

The hard key interface part 9 is composed of a not-shown sub-CPU and the like, and provided for determining a state of user interface such as not-shown keys and dials and controlling a main switch of the main CPU of the system control part 2.

The communication interface part 10 is composed of a communication controller, and provided for data communication with a not-shown USB connected.

The connected apparatus 11 is composed of a personal computer and the like, and connected with the digital still camera device 1 via a not-shown USB to transfer images from the digital still camera device 1 for reproduction and make various setting to the digital still camera device 1.

First, initiation of the digital still camera device 1 will be described.

When a user presses down a not-shown switch button, the hard key interface part 9 turns on the main CPU of the system control part 2.

The main CPU of the system control part 2 first starts accessing (execution of program) to a boot part of the NAND flash memory and transfers program data to the SDRAM (Synchronous Dynamic Random Access Memory) in exterior by a boot program.

Upon completion of the data transfer to the SDRAM, an execution pointer (program counter) of the program is transferred to the program on the SDRAM, and thereafter the boot processing starts according to the program on the SDRAM.

The initiation processing includes initialization of OS (operating system), extension operation of a lens barrel, and initialization of the storage medium 8.

The extension operation of the lens barrel is performed by supplying a pulse signal to the lens drive motor of the image capturing part 3 via the image processing part 4 at a predetermined interval (2 mS, for example).

Also, the initialization of the storage medium 8 is made by supplying power and a clock to storage medium 8 via the storage medium interface part 7, and thereafter issuing an initialization command to the storage medium 8. Actual initialization is made in the storage medium 8, and the system control part 2 makes polling of a status of the storage medium 8 at an interval of 10 mS, for example in order to detect the completion of the initialization.

Next, operation at shooting will be described.

Prior to shooting, a user manipulates not-shown various keys and dials to decide a shooting mode (high image quality mode, low image quality mode, etc.). The user's manipulation is determined by the system control part 2 through the hard key interface part 9. The system control part 2 causes the display control part 5 to generate and display graphical guidance for prompting the user to proceed to the next operation.

The system control part 2 sets a process parameter in the image processing part 4 in accordance with the decided shooting mode. Alternatively, the user manipulates a not-shown zoom lever to decide a angle of view (picture composition).

The user's manipulation to the zoom lever is determined by the system control part 2 through the hard key interface part 9. The system control part 2 controls the image capturing part 3 in accordance with the manipulation to drive the lens.

The image capturing part 3 starts capturing an image under the control of the image processing part 4. The image processing part 4 initiates face detection processing on image data detected by the image capturing part 3.

Moreover, the captured image data are transmitted continuously to the image processing part 4, subjected to color space conversion, gamma correction, white balance adjustment and the like therein, and then transmitted to the display control part 5.

Also, at the same time, the image processing part 4 performs focusing and exposure detection using a result of the face detection to control the image capturing part 3 to make adjustments. The display control part 5 performs signal processing on image data for display on the LCD 6, and shows the user a state of the captured image.

Here, when the user presses down a not-shown release button, the manipulation thereto is determined by the system control part 2 via the hard key interface part 9.

The image capturing part 3 accepts a predetermined image under the control of the image processing part 4 and transmits it to the image processing part 4. The image processing part 4 subjects the image to image processing and compression pressing in compliance with the shooting mode.

The system control part 2 reads the compressed image data and adds header information thereto, and then write it to the storage medium 8 through the storage medium interface part 7.

This completes a series of the shooting operation.

Next, a description will be made on an example of detecting and following a face in an image and setting a detection region with the detection region shifted from a center of the image towards a periphery of the image.

Figure 2:
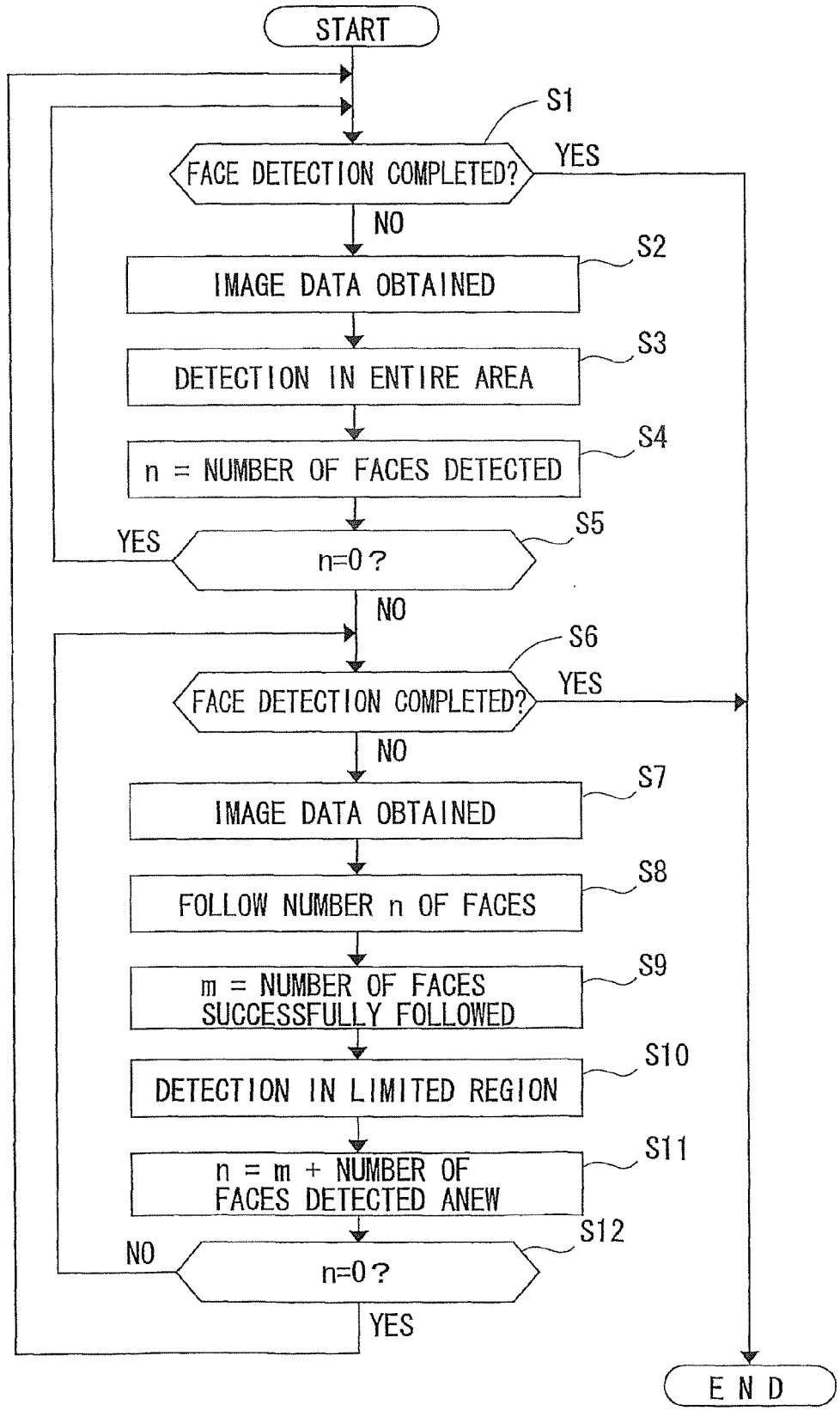
FIG. 2 is a flow chart showing a flow of a subject detection processing according to the first embodiment.

This operational flow is shown in FIG. 2. Note that the flow therein shows only an operation related to the face detection. It should be understood that the above-mentioned processings for focusing, exposure adjustment, and image display is separately performed in parallel with the operational flow in FIG. 2; therefore, a description thereof will be omitted.

Figures 3A, 3B:
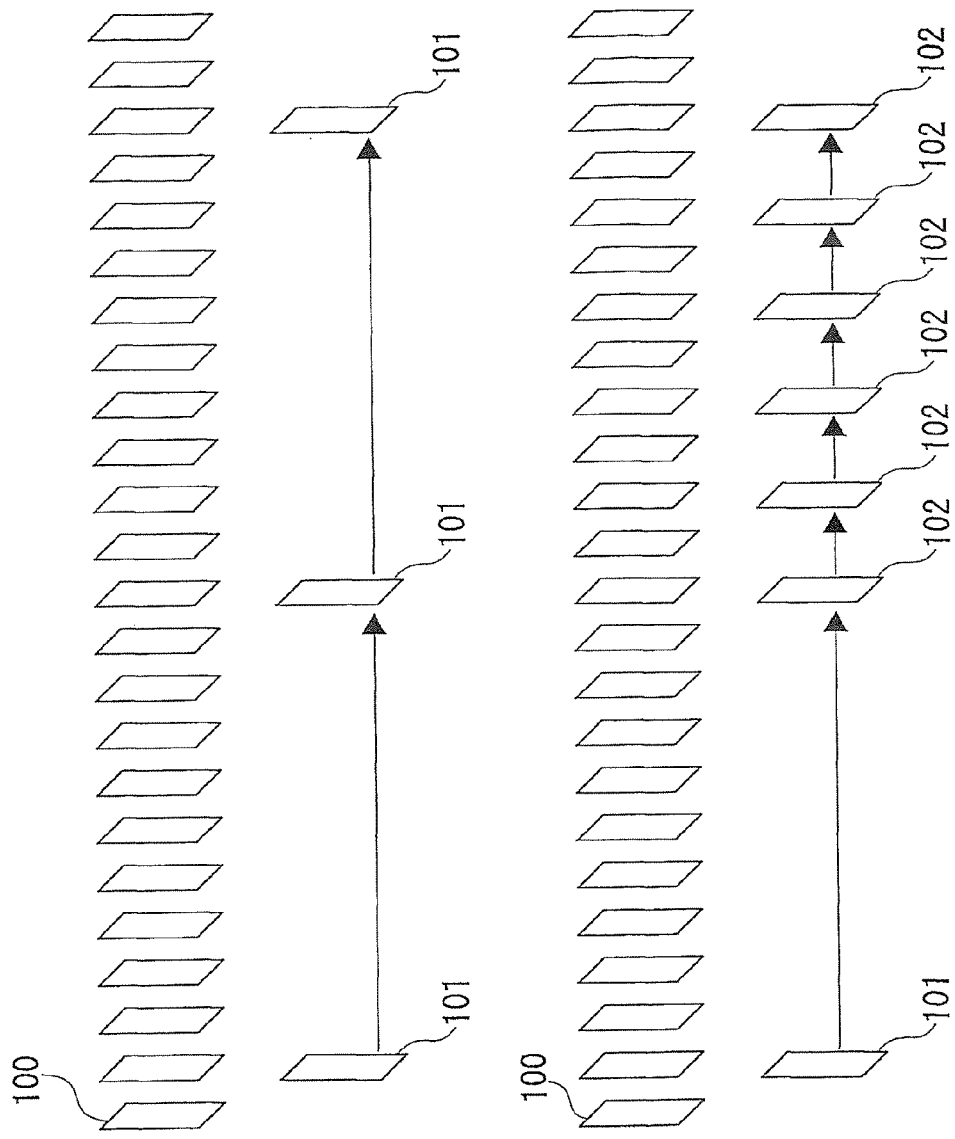
FIG. 3A shows a relationship between image data 100 continuously captured by the digital still camera device 1 according to the first embodiment and image data 101 for detection of a subject.
FIG. 3B shows a relationship between image data 100 continuously captured by the digital still camera device 1 according to the first embodiment and image data 102 for following a subject.

The image processing part 4 obtains image data 101 used in the face detection from image data 100 continuously captured by the image capturing part 3, as shown in FIG. 3A (Step S2), and performs the detection processing on the entire area of the obtained image data 101 (Step S3). The face detection processing in Step S3 corresponds to the subject detection by the first detection part. Note that the face detection can be performed by using the technique described in Japanese Laid-Open Publication No. 2003-107335, for example.

In a case where no face is detected in the obtained image, the above-mentioned processing is repeated until the end of a face detection mode (Step S5 to Step S1).

On the contrary, when the number n of faces detected in Step S4 is one or more, the image processing part 4 proceeds to the processings in Step S6 and thereafter to obtain the image data 102 used in the following processing as shown in FIG. 3B (Step S7), and perform the following processing on the number n of faces detected (Step S8). The following processing in Step S8 corresponds to following the subject by the second detection part. This following processing can be performed by using the technique described in Japanese Laid-Open Publication No. 2006-60329, for example.

The system control part 2 controls the series of control operation above. Also, coordinate values of the regions in which the faces are detected by the detection and following are stored separately in the system control part 2, and referred to in the focusing, exposure adjustment or image display processing when necessary.

Next, the image processing part 4 performs the face detection in a limited region 201 (Step S10).

The limited region will be described herein.

FIGS. 4A, 4B, 5A, and 5B show examples how the limited region 201 is set. In the drawings, the number 200 represents image data corresponding to the extracted images 101, 102 in FIGS. 3A and 3B, and the limited region 201 is set in a part of the image data 200 by the setting part. Since the limited region 201 is set in a part of the image data 200, it is possible to perform the face detection in Step S10 in a shorter period of time, compared with the face detection in the entire image data 200 in Step S3.

The limited region 201 is set every time the processing in Step S10 is performed. First, a region of a size corresponding to a part of the image data 200 is set in the center of the image data 200. Then, the face detection is performed while the position of the region is changed in the sequence indicated by the arrows upon every processing in Step S10.

The position of the region is shifted from a position including the upper left end of the image data to a position including the lower right end thereof. In the example shown in FIG. 4B, the region is shifted from the upper left portion of the image data 200 to the upper right portion thereof by three steps, then the middle portion of the image data 200 in a vertical direction is shifted from left to right, and the lower portion of the image data 200 is shifted from left to right. Here, the limited region 201 is set to have a size to overlap with a next set limited region in vertical and horizontal directions.

Further, according to the first embodiment, the size of the limited region 201 is set depending on the size of the face detected. That is, in case of the face in FIG. 4A, the size of the limited region 201 is set to a size shiftable in the entire area of the image data 200 by 9 steps. As shown in FIG. 5A, when the size of the detected face is larger than that in FIG. 4A, the size of the limited region is set to be larger that in FIG. 4A and shiftable in the entire area of the image data 200 by 5 steps.

As described above, setting the size of the limited region 201 depending on the size of the detected face makes it possible to perform an effective processing by preventing required processing time from being elongated due to an unnecessarily large size of the limited region 201 as well as to perform an effective processing on a new subject detected in the image data 200.

The system control part 2 updates the number n of faces detected to a number n which is a sum of the number of faces detected anew and the number m of faces successfully followed (Step S11). With one or more faces detected, the following processing in Step S6 and thereafter is continued for the number n of faces detected. With no faces detected, the detection processing in Step S1 and thereafter is resumed on the entire area (Step S12).

Figure 6:
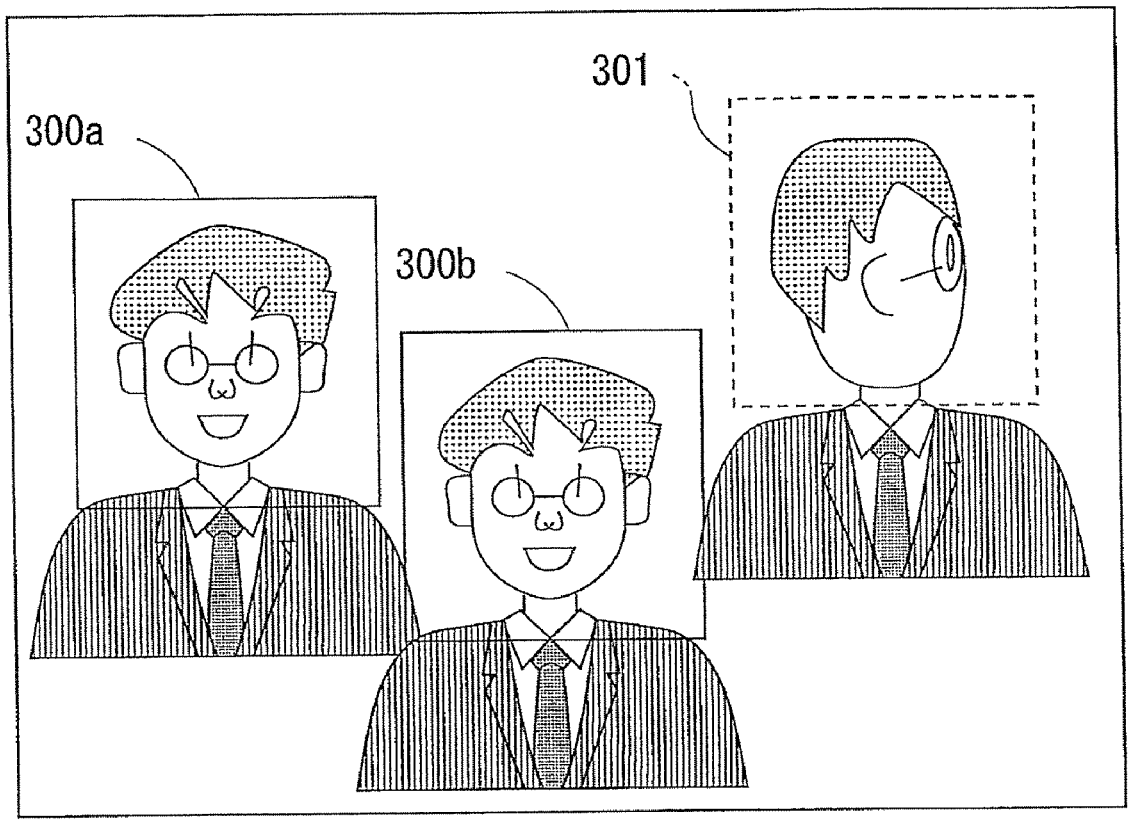
FIG. 6 is an explanatory diagram for operation according to the first and second embodiments.

Here, the number m of faces successfully followed and the number of faces detected anew will be described with reference to FIG. 6.

For shooting three people as shown in the drawing, for example, the number n of faces detected is 3 when the face detection is performed in the entire area of the image data 101 in FIG. 3A through the processing in Steps S1 to S4. However, in the following processing on the image data 102, when the number m of faces successfully followed is 2 as indicated by the framed portions 300a, 300b in FIG. 6, and no new face is detected from the limited region 201 at this point, the processing returns to Step S6 since the number n is 2 in Step S11. Then, the following processing on the image data 102 and the detection processing in the limited region 201 are repetitively performed.

During the repetition of the above processing, when a face is detected in the framed portion 301 in which the following processing has not been succeeded, the number of faces detected anew which is 1 is added to the previous number m of faces successfully followed. Accordingly, in the next processing, the number n will be 3, so that three faces will be followed.

Thus, even when the face detection is interrupted in the middle of following the faces, the successfully followed faces are continuously followed, and the face detected anew is also followed.

Also, even in a case where a new person appears in the image, and is detected in the limited region 201, the face of the newly detected subject is added to the number n of faces detected, enabling the following of the added face.

As described above, the digital still camera device 1 according to the first embodiment is configured to have both the following processing and the face detection in the limited region 201, so that it is possible to prevent an update cycle for the detection result from being greatly elongated unlike in the face detection in the entire image. Moreover, it is possible to detect unsuccessfully followed faces later again or a new face appearing in the angle of view and follow such faces.

(Other Embodiments)

Hereinafter, other embodiments will be described. Note that identical or similar components therein to those in the first embodiment are given the same codes and numerals; therefore a description thereon will be omitted.

(Second Embodiment)

Figure 7:
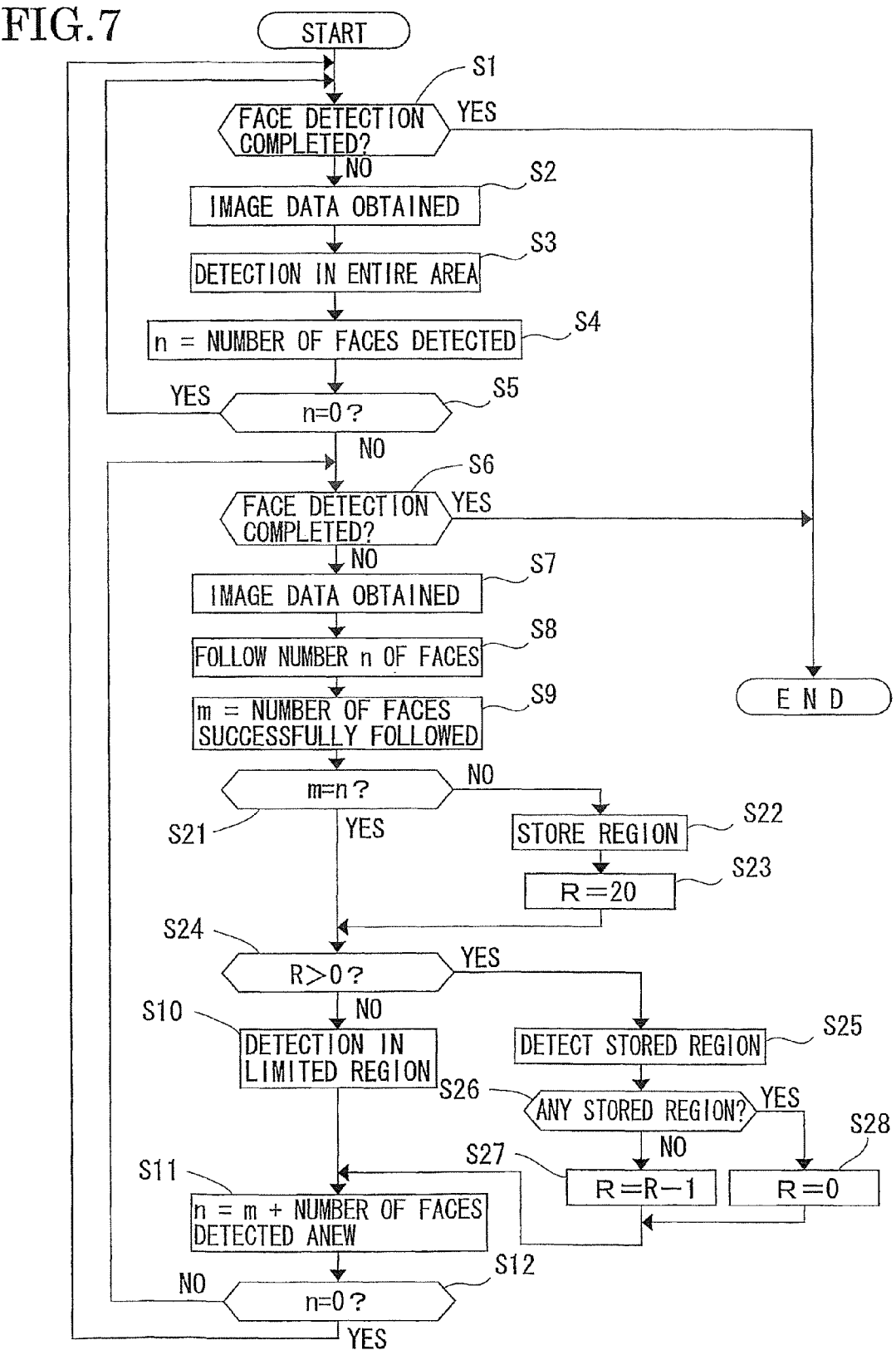
FIG. 7 is a flow chart showing a flow of subject detection processing according to the second embodiment.

The digital still camera device 1 functioning as the imaging device 1 according to the second embodiment will be described with reference to FIGS. 6 and 7.

In the second embodiment, a region in which the face following processing is failed is set as a detection area for a predetermined time.

The operation of the second embodiment will be described according to the flow chart in FIG. 7. Note that the processing in Steps S1 to S9 is the same as that in the first embodiment, therefore, a description thereon will be omitted.

After the following, when there is a face unsuccessfully followed among all the faces (Step S21), the system control part 2 stores a region including the unsuccessfully followed face (Step S22), and sets a counter value R (Step S23). The counter value R is for designating a number of repetitions of detection performed in the stored region (limited region). Here, it is set at 20.

Unless the counter value R is zero (Step S24), the detection is performed in the region including the unsuccessfully followed face stored in Step S22 (Step S25). With a face detected in this stored region, the counter value R is cleared (Steps S26 to S28). With no face detected in this stored region, the counter value R is subtracted by 1 (Step S27), and maintained until the next operation.

Also, with the counter value R being zero, the processing in Step S10 is performed as in the first embodiment.

Note that the counter value R is also referred to in the display processing. With the counter value R being other than zero, the image as shown in FIG. 6 is displayed. That is, in FIG. 6, the framed portions in solid lines 300a, 300b show successfully followed faces in the frames while the framed portion in dashed line 301 represents a framed region including an unsuccessfully followed face which is under the detection in Step S24 (detection is performed again).

The display representing that the unsuccessfully followed face is being detected is kept on while the processing in Steps S21 to S28, that is, the face detection in the stored area including the unsuccessfully followed face is being performed.

Note that the framed portions 300a, 300b of the successfully followed face and the framed portion 301 of the unsuccessfully followed face can be distinguished by different colors or shapes (for example, circular frame when succeeded, square frame when failed), different display periods (blink indication), or the combination of these, in addition to the lines, solid and dashed.

Other operations according to the second embodiment is the same as those in the first embodiment, therefore, a description thereon will be omitted.

Through the above-described processing, it is made possible to perform with efficiency re-detection of the face unsuccessfully followed temporarily because the subject turns around or the like.

Moreover, displaying the successfully and unsuccessfully followed faces in the frames of the different shapes as above makes it possible for the user to understand the detection state of the camera properly. Accordingly, the user can give an appropriate operational instruction to the subject.

(Third Embodiment)

Now, the third embodiment will be described with reference to FIGS. 8A to 8C.

The third embodiment is constituted such that in the detection processing in the limited region in Step S10 of the first embodiment, the limited region 201 is set in the center of the image data 200 with a frequency which changes according to a focal length. In the third embodiment, the limited region 201 is set to have a certain size enough to be shifted in the image data 200 by 9 steps as shown in the example of FIG. 4B.

Specifically, according to the third embodiment, the frequency with which the limited region 201 is set in the center of the image data 200 is 1/9, 1/5, 1/3 according to the focal length F. In other words, the frequency 1/9 is set when the focal length F<50 mm. Note that the focal length is a converted value for the optical system of a camera using a 35 mm film. Also, the frequency 1/5 is set when 50 mm≦the focal length F<100. The frequency 113 is set when the focal length F≧100.

Figure 8A:
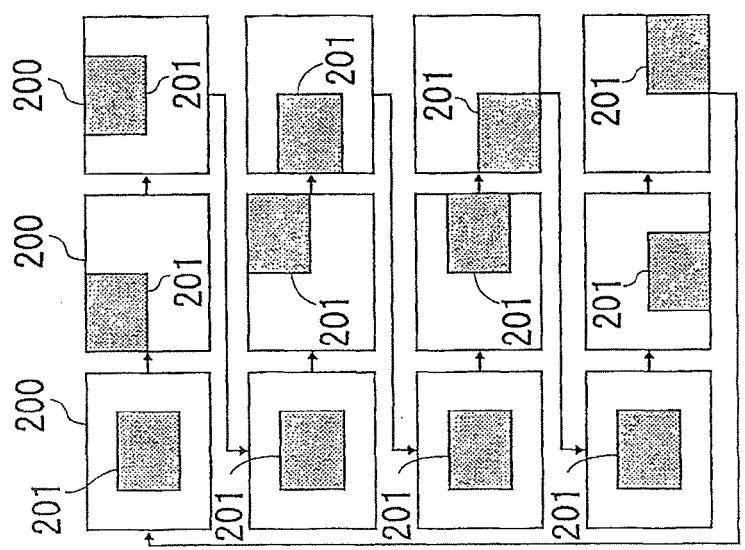
FIG. 8A shows a state of shifting of the limited region 201 when a frequency with which the limited region 201 is set in the center of image data 200 is 1/9 according to the third embodiment.

FIG. 8A shows a case where the focal length F is less than 50 mm and the frequency is 1/9. While the limited region 201 is shifted in the entire image data 200, it is set in the center of the image data 200 only once at the first step.

Figure 8B:
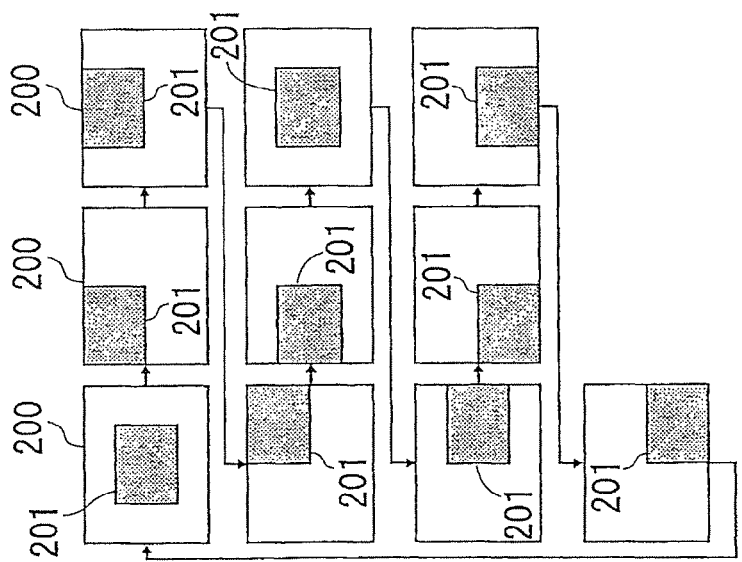
FIG. 8B shows a state of shifting of the limited region 201 when a frequency with which the limited region 201 is set in the center of image data 200 is 1/5 according to the third embodiment.

Next, FIG. 8B shows a case where the focal length F is less than 100 mm and the frequency is 1/5. While the limited region 201 is shifted in the entire image data 200, it is set in the center of the image data 200 twice at the first and sixth steps.

Figure 8C:
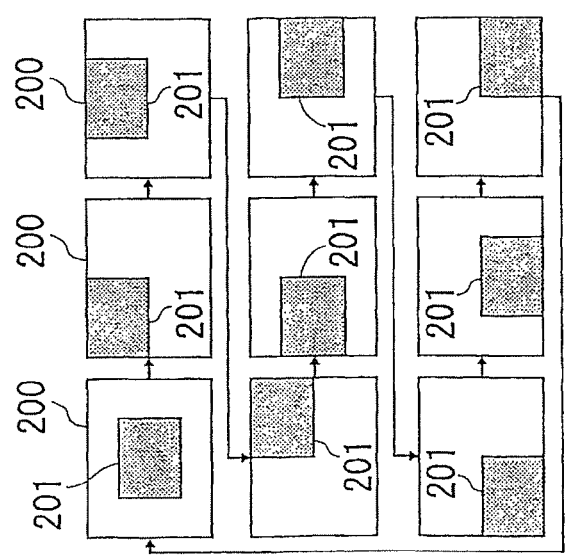
FIG. 8C shows a state of shifting of the limited region 201 when a frequency with which the limited region 201 is set in the center of image data 200 is 1/3 according to the third embodiment.

Then, FIG. 8C shows a case where the focal length F is 100 mm or more and the frequency is 1/3. While the limited region 201 is shifted in the entire image data 200, it is set in the center of the image data 200 four times at the first, fourth, seventh, and tenth steps.

Therefore, the subject can be set around the center of the image data in various photographic situations. The longer the focal length is, the more likely the subject is set in the center thereof.

Thus, increasing the frequency with which the limited region 201 is set in the center of the image data 200 makes it possible to detect a subject and even a new subject in a shorter period of time.

As described above, the digital still camera device 1 according to the first to third embodiments has such an advantageous effect that it can detect the subject at a higher speed than detecting it in the entire image (the image data 200) since it follows the detected subject. Also, since it detects the subject not in the entire image but in the limited region 201 as a part of the image, it is preventable of the update cycle for the detection result from being greatly elongated. Moreover, it is possible to detect even the subject unsuccessfully followed and new subjects captured in the angle of view during the following of the subject.

Further, the digital still camera device 1 according to the first to third embodiments has such an advantageous effect that it can detect a main subject immediately after transition to the following processing with efficiency without a failure, since it is configured that the set limited region 201 is shifted from the center of the image towards the periphery thereof.

Further, the digital still camera device 1 according to the first to third embodiments has such an advantageous effect that it can detect a subject in the limited region 201 without a failure since the limited region 201 is shifted to overlap with a next set limited region.

Further, the digital still camera device 1 according to the first to third embodiments has such an advantageous effect that it can quickly detect a subject lost (unsuccessfully followed subject) because of movements of the subject, by setting a limited region 201 including the lost subject as a preferential detection region.

In addition, when the limited region 201 is set depending on the size of a subject in the digital still camera device 1 according to the first to third embodiments, it is possible to prevent the required processing time from being greatly elongated due to a unnecessarily large limited region 201, enabling efficient processing, as well as to achieve the efficient processing even on a new subject detected in the image.

Further, when the limited region 201 is set according to photographic magnification in the digital still camera device 1 according to the first to third embodiments, it is possible to assume the size of a subject and prevent the required processing time from being greatly elongated due to a unnecessarily large limited region 201, enabling efficient processing, as well as to achieve the efficient processing even on a new subject detected in the image.

Further, the digital still camera device 1 according to the first to third embodiments is configured such that the region including the center of the image is set as the limited region 201 with a higher frequency. This makes it possible to capture a subject in the limited region with a high probability, enabling the efficient processing and detection of a new subject captured in the image in a shorter period of time.

In addition, the digital still camera device 1 according to the first to third embodiments is configured such that the frequency with which the region including the center of the image is set as the limited region 201 is determined according to a focal length. This makes it possible to capture a subject in various photographic situations in a short period of time and to detect a newly captured subject in a short period of time.

Moreover, the digital still camera device 1 according to the first to third embodiments is configured to display a region including a subject unsuccessfully followed, so that the user can appropriately know the detection state of the imaging device. Also, the user can give a proper operational instruction to the subject.

Further, the digital still camera device 1 according to the first to third embodiments is configured to display a re-detection period where the region including the subject unsuccessfully followed is being under the detection again, so that the user can appropriately know the detection state of the imaging device. Also, the user can give a proper operational instruction to the subject.

Hereinbefore, the embodiments of the present invention has been described in detail with reference to the drawings, however, the specific configuration of the present invention is not limited thereto. It should be understood that variations of designs are incorporated in the present invention without departing from the scope of the present invention.

For example, the first to third embodiments have described the examples where faces are detected as a subject; however, the subject is not limited to the faces. It can be set appropriately for various intended purposes.

Further, the ratio at which the image data 101 for detecting a subject in the entire image data 100 and the image data 102 for the following and detection are extracted from the continuously shot image data 101 can be set appropriately according to the processing speed. Therefore, it is not limited to the examples shown in FIGS. 3A and 3B.

Further, the first embodiment has described on the example where the limited region 201 is set to be shifted in order from the center of the image to the periphery thereof, from the top to the bottom, and from left to right. However, the setting of the limited region 201 is not limited thereto, and it can be randomly done in a pre-set order. In this case, the center portion of the image is likely to include a shooting subject, and the other portions include the subject at substantially equal probabilities. Therefore, the detection rate of the random detection can be equivalent to that of the orderly detection from the top and from left as above.

Figure 4A:
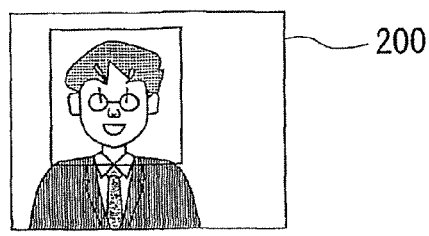
FIG. 4A shows an example of image data 200, showing a relationship among a size of a face detected, the entire image, and a limited region according to the first embodiment.
Figure 4B:
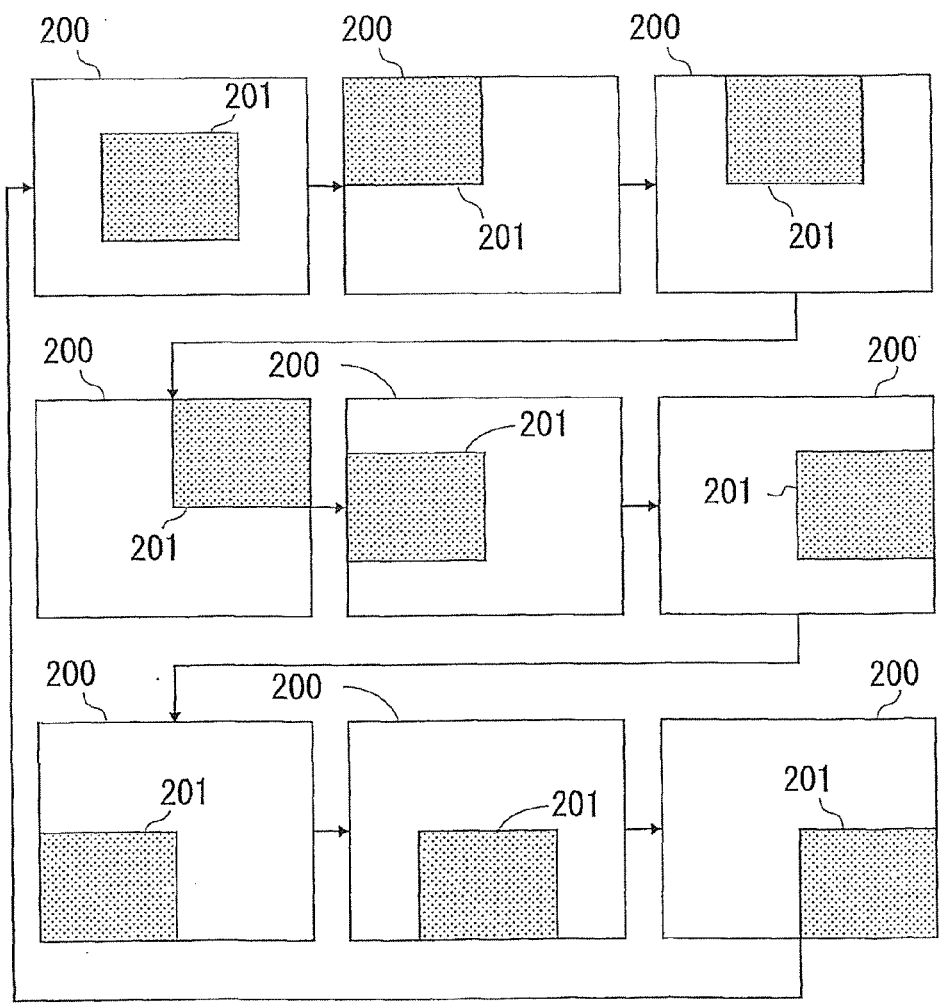
FIG. 4B shows an example of shifting of a limited region 201 in the image data 200 of FIG. 4A, showing a relationship among a size of a face detected, the entire image, and a limited region according to the first embodiment.
Figure 5A:
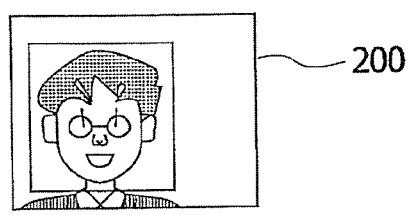
FIG. 5A shows an example of image data 200, showing a relationship among a size of a face detected, the entire image, and a limited region according to the first embodiment.
Figure 5B:
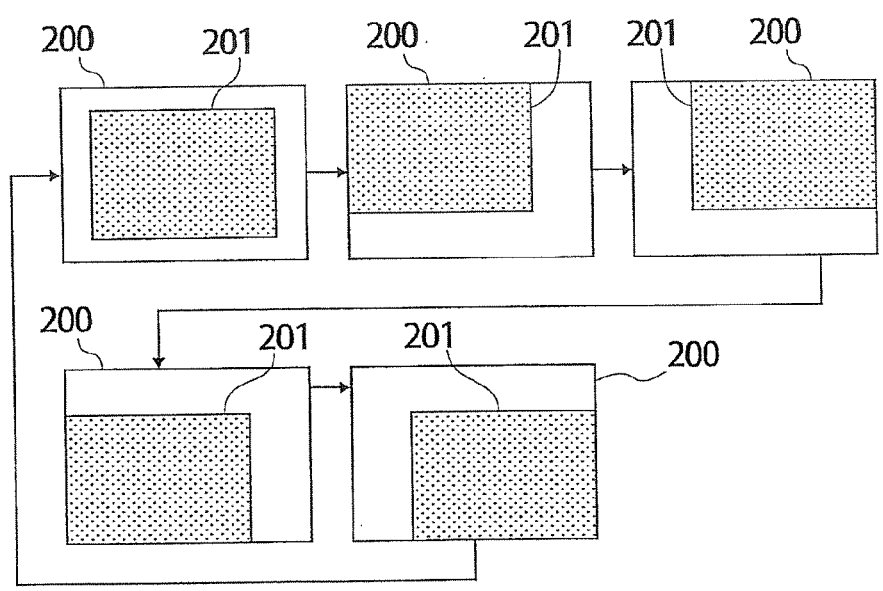
FIG. 5B shows an example of shifting of a limited region 201 in the image data 200 of FIG. 5A, showing a relationship among a size of a face detected, the entire image, and a limited region according to the first embodiment.

Further, the first embodiment has described on the example where the limited region 201 is determined according to the size of the face detected, however, the detection region can be determined according to photographic magnification In this case, it can be configured that the relatively larger the photographic magnification is, the relatively larger the limited region is set, as shown in FIG. 5A, and the relatively smaller the photographic magnification is, the relatively smaller the limited region is set, as shown in FIG. 4A.

In addition, the first to third embodiments have described the examples where the present invention is applied to the digital still camera device; however, the application thereof is not be limited thereto. The present invention is also applicable to devices with a photographic function other than the digital still camera such as an optical camera, a video camera, or a mobile phone.

Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:

1. An imaging device comprising:
   an image capturing part which captures an image continuously;
   a first detection part which detects one or more subjects in an image captured by the image capturing part;
   a second detection part which follows and detects the one or more subjects detected; and
   a control part which includes a setting part setting a part of the image as a limited region, and causes, after the first detection part detects the one or more subjects in the captured image, the second detection part to follow and detect a subject in an image captured subsequently to the captured image, and causes the first detection part to detect a subject in the limited region, wherein the setting part sets a region including the center of the image as the limited region with a higher frequency than a region not including the center of the image, and wherein the setting part determines, according to a focal length, a frequency with which the region including the center of the image is set as the limited region.

2. A subject detection method comprising:

a first detection step of detecting one or more subjects in frames of an image captured continuously;

a second detection step of following and detecting the one or more subjects detected by the first detection step, the second detection step being able to be processed at a higher speed than the first detection step;

after detecting the one or more subjects in a first region of a first frame of the image by the first detection step, a step by the second detection step of following and detecting the one or more subjects in a second and subsequent frames of the image;

a step by the first detection step of detecting, while shifting the limited region in position over the second and subsequent frames of the image, a subject in a limited region which is set in a part of the image that is smaller than the first region of the image;

setting a region including the center of the image as the limited region with a higher frequency than a region not including the center of the image; and determining, according to a focal length, a frequency with which the region including the center of the image is set as the limited region.

* * * * *